Patented Nov. 12, 1929

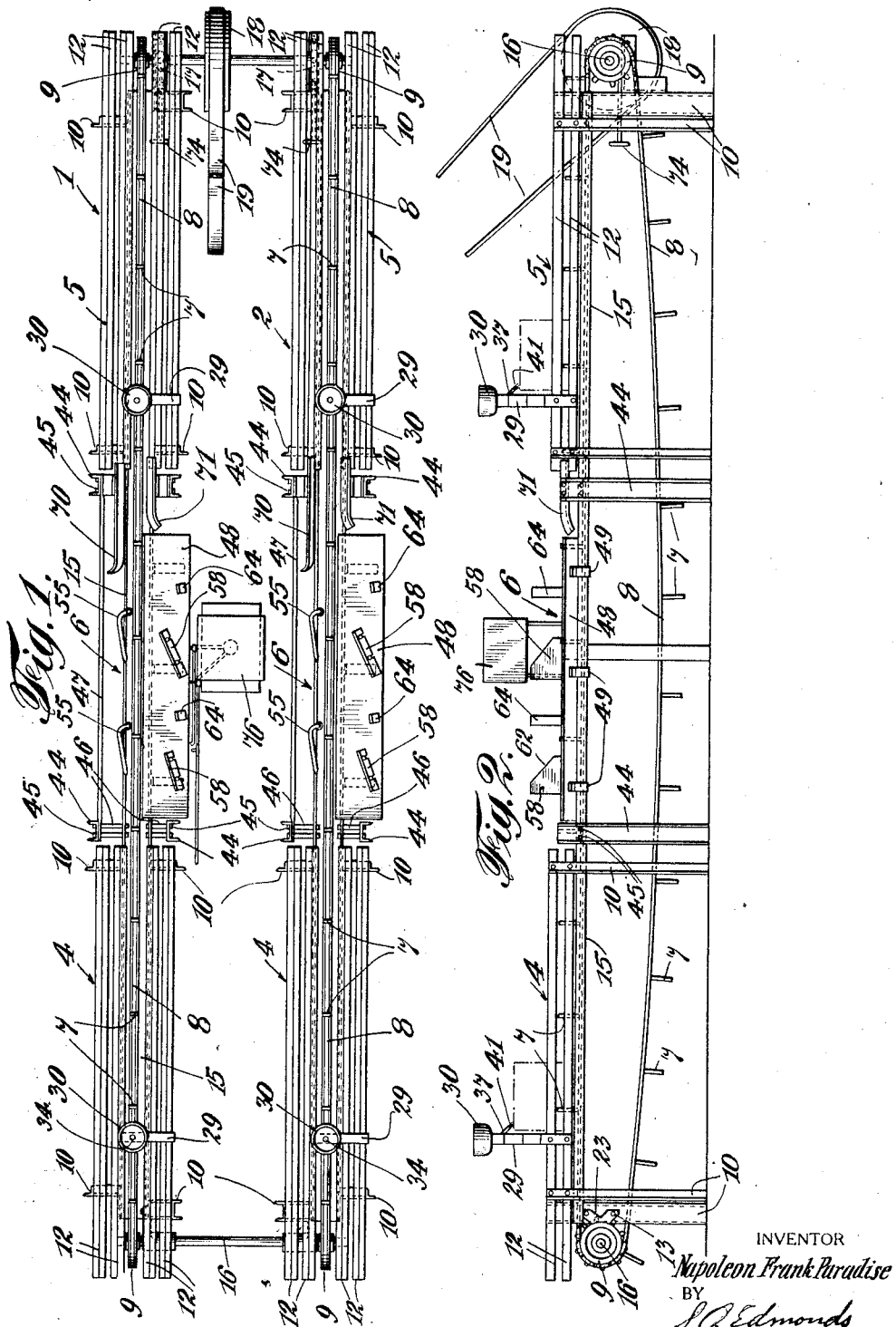

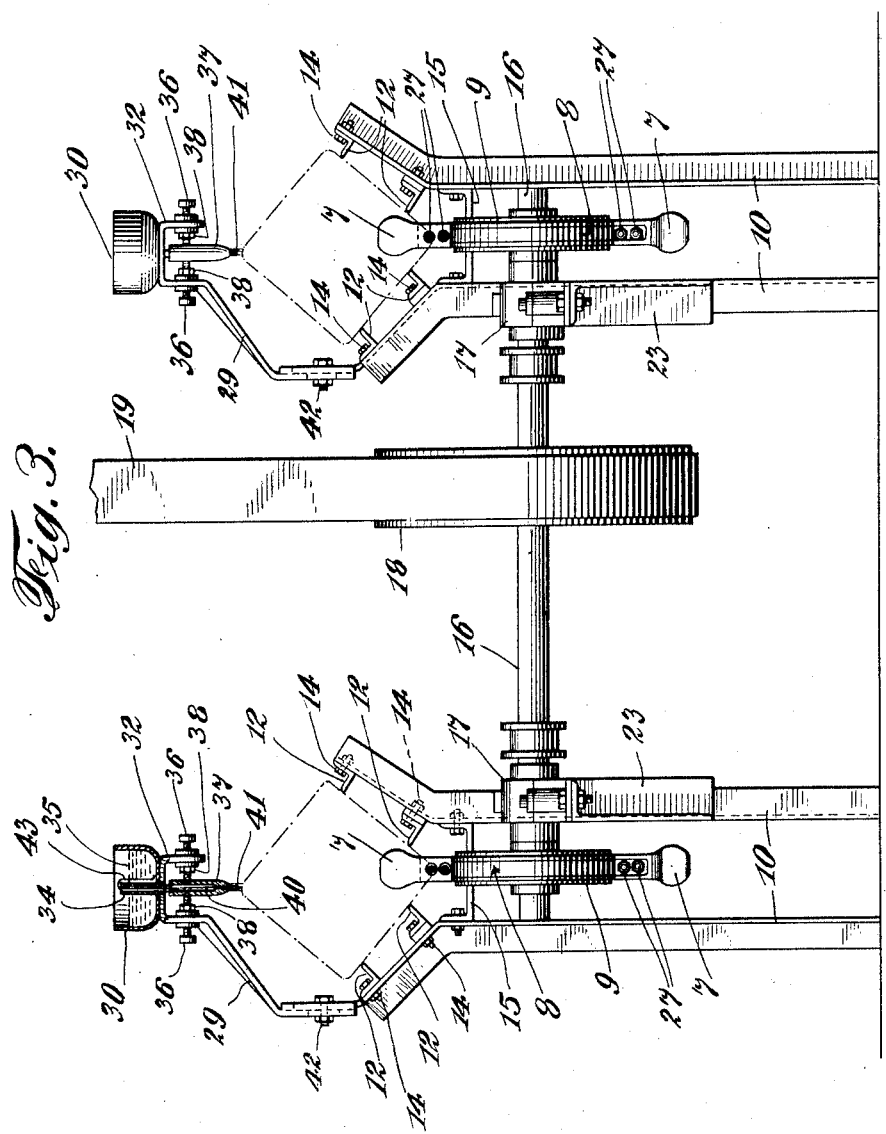

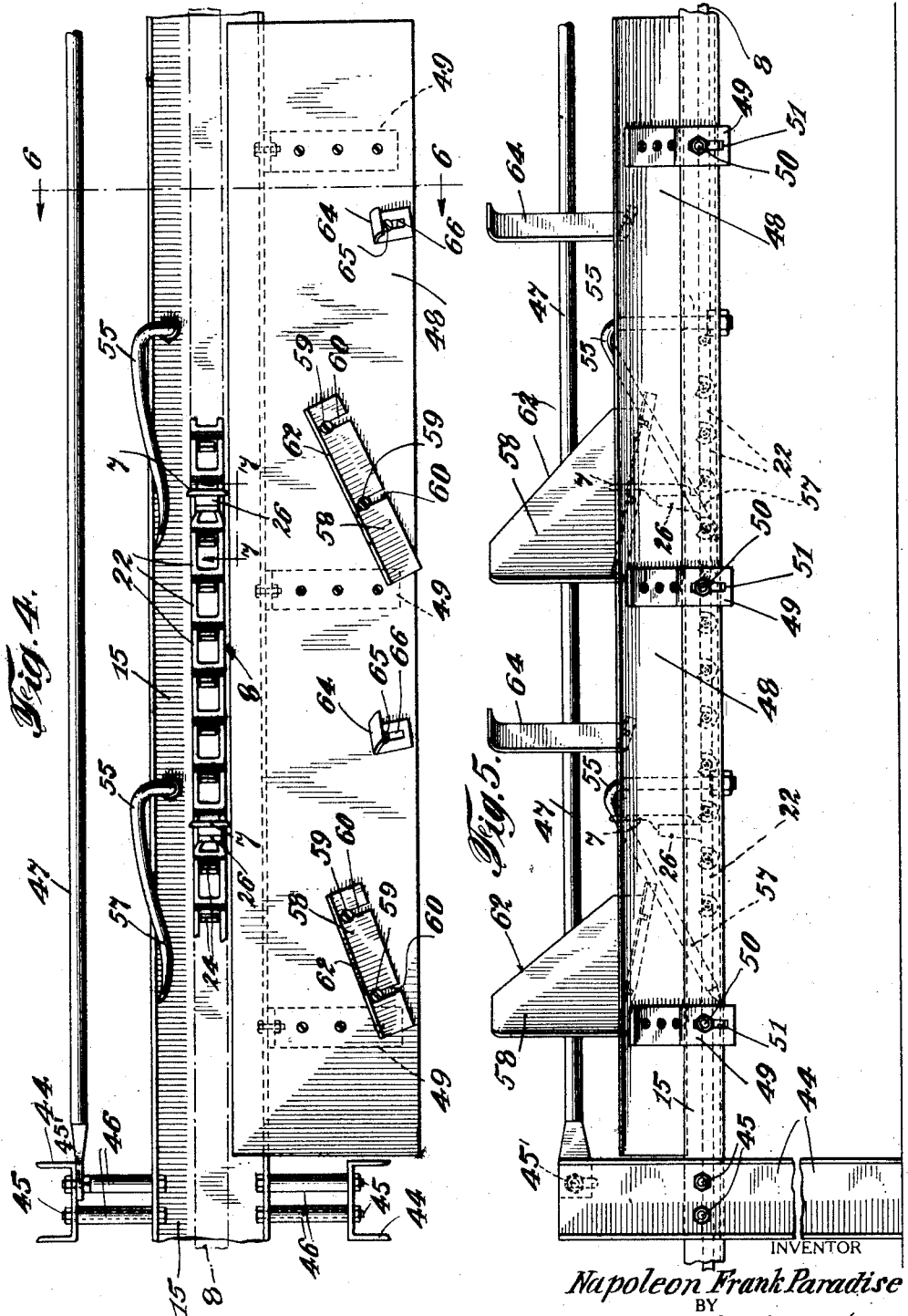

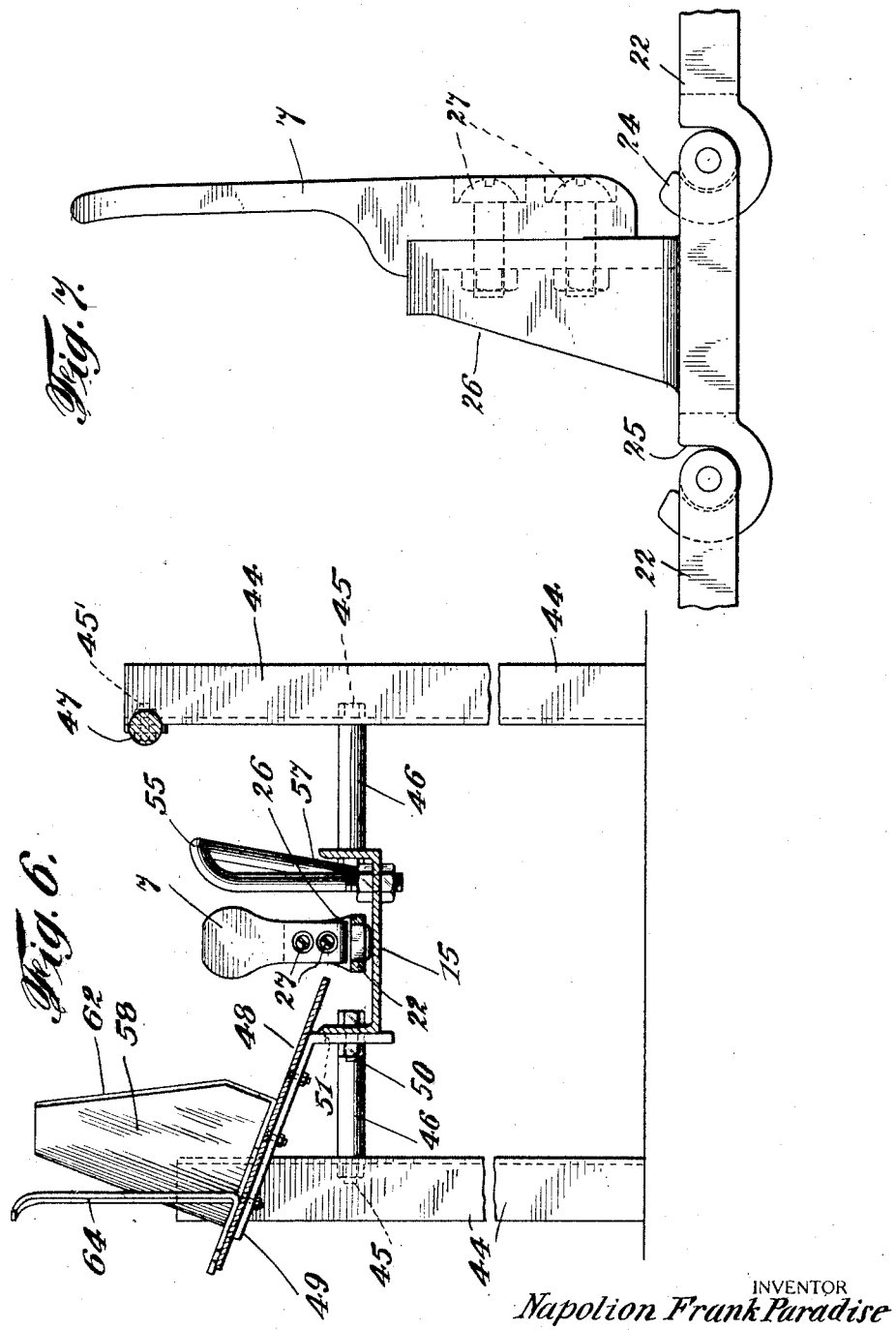

1,735,336

UNITED STATES PATENT OFFICE

NAPOLEON FRANK PARADISE, OF SHANGHAI, CHINA, ASSIGNOR TO STANDARD OIL COMPANY OF NEW YORK, OF NEW YORK, N. Y., A CORPORATION OF NEW YORK

CONVEYER SOLDERING MACHINE

Application filed November 19, 1926. Serial No. 149,310.

The present invention relates to conveyers, and more particularly to conveyers and associated mechanisms for use in soldering the side seams of containers and the like.

Heretofore in the art, it has been customary in soldering the side seams of cans and metallic containers to carry the cans from the automatic top and bottom soldering machines to benches where several cans are placed in line thereon. Two laborers move along the bench, the first applying acid to the exposed seam of each can and the second soldering the seam. Upon completion of the soldering operation of one seam, a third laborer turns the can over so that the other side seam is in position for receiving acid and solder. Cans are then carried from the benches to a delivery conveyer. In addition to the requirement of three laborers working constantly such operation occasions considerable loss of time due to the fact that any delay on the part of one of the operators delays the other two correspondingly.

An object of the present invention is to minimize the labor required in soldering side seams by automatically applying the acid to the side seams of the containers moving along a conveyer and by moving the containers after the acid is applied past an operator with the side seam in position for the application of solder.

Another object of the invention is to facilitate the application of acid and solder by providing a continuous conveyer adapted to move a container under an acid-applying mechanism and past an operator with the seam in position to receive the acid and solder; and thereafter automatically to invert said container and present the other side seam to an acid-applying mechanism and move it past a second operator for the application of solder thereto.

A further object of the invention is the provision of acid-applying devices adapted to be mounted above a conveyer and provided with a pivotally mounted brush for yieldably engaging the side seam of the container for applying acid thereto.

Other and further objects of the invention will be obvious upon an understanding of the illustrated embodiment about to be described or indicated in the appended claims, and various advantages other than those specifically referred to herein will occur to one skilled in the art upon employment of the invention in practice.

A preferred embodiment of the invention has been chosen for purposes of illustration and description and is shown in the accompanying drawings, wherein Fig. 1 is a top plan view of the machine;

Fig. 2 is a side elevational view of the machine;

Fig. 3 is an end view taken from the right end of the machine as shown in Fig. 1;

Fig. 4 is a detailed plan view illustrating the turning devices and associated mechanism;

Fig. 5 is a side elevational view of the parts shown in Fig. 4;

Fig. 6 is a sectional view taken along the line 6—6 of Fig. 4; and

Fig. 7 is a detailed view of a portion of the conveyer chain and a locking lug taken the line 7—7 in Fig. 4.

Described generally, the present invention comprises two conveyers 1 and 2 substantially similar in construction to accommodate two lines of cans simultaneously. Each conveyer comprises benches 4 and 5 with an intermediate turning mechanism 6. For convenience in description, one only of the conveyers will be described, it being understood that the parts of the other conveyer are numbered correspondingly and the description therefore applies to either conveyer. Containers are placed on the bench 4 with one of the corner seams uppermost. These containers are moved by the lugs 7 on the conveyer chain 8 along the first bench for the automatic application of a suitable acid to the upper seams and for the manual application of solder. As the containers leave bench 4, they are subjected to a turning operation, on the portion 6 intermediate the benches 4 and 5, and inverted to present the bottom seams of the containers in uppermost position whereupon they are moved onto bench 5 for the automatic application of acid and for the manual application of solder to the seams. The cans are delivered from the bench 5 with both side seams soldered.

The bench 4 of each conveyer is preferably formed by upright supporting members 10 which may be angular in form flared at their upper ends to receive horizontal supporting members such as the angle bars 12 attached to the upright members by means of the bolts 14. A pair of these angle bars are mounted on each of the upright supports so that a V-shaped guideway is formed with two of the horizontal supporting members engaging each of the bottom sides of a can placed therein, thereby retaining the can with one corner uppermost and with the opposite corner in line with the lugs 7 on the conveyer chain. A channel member 15 is mounted between the upright members adjacent their flared portions and extends the entire length of the machine to support the upper portion of the conveyer chain.

At each end of the machine, there is a shaft 16 extending between the two conveyers mounted in suitable bearings 17 attached to one of the vertical supports 10 of each conveyer, by means of the bolts 13 and the bracket 23. Suitable sprockets 9 are mounted on the ends of the shafts substantially midway between the vertical supports 10 and carry the chains 8, the upper loops of which rest upon the channel members 15. The chains 8 for convenience may comprise a series of links 22 having hooks 24 at one end for engaging apertures 25 at the other ends of the links whereby a flexible chain is formed. At suitable intervals, one of the links 22 is formed with an upstanding extension 26 to which the lugs 7 are secured by means of the bolts 27. These lugs engage the respective cans positioned in the V-shaped guideway as shown in Fig. 3 and move them from one end of the machine to the other. A pulley 18 is mounted on one of the shafts 16 and driven by belt 19 for operating both of the conveyers.

At a suitable point on bench 4 of each of the conveyers, a bracket 29 is adjustably attached to the horizontal angle members 12 and extends upwardly over the conveyer chain to support a lead lined bowl or reservoir 30 for a suitable acid or other fluid for application to the seams of the containers prior to the soldering operation to make solder adhere thereto. While any suitable means may be used to apply the acid or other fluid to the seams, preferably the bowl 30 is mounted above an inverted U 32, formed at the free end of the bracket 29. A conduit or tube 34 extends upwardly into the bowl above the level of the fluid 35. Below the conduit and at the sides of the inverted U, a pair of bolts 36 are threaded to engage a brush holder 37 preferably of hard wood. Suitable locking nuts 38 on the bolts 36 permit adjustment in lateral position so that any desired pressure may be applied to the brush handle. Such a construction pivotally holds the brush in position and the location of the pivot is such that the brush tends to remain perpendicular due to the weight of the lower end thereof, causing the upper end to engage the lower end of the conduit 34, whereby the brush handle is yieldably held in canted position.

A suitable pocket or reservoir 40 is formed inside of the brush holder 37 with a small opening leading to the brush 41. A wick 43 extends through the conduit 34 and hangs over into the fluid in the upper reservoir and extends downwardly into the pocket 40 in the brush handle to conduct the liquid from the upper reservoir to the brush. As a container moves under the brush, the bracket 29 is adjusted vertically by means of the bolt 42 until the tip of the brush engages the seam and the brush handle is rotated slightly by the container as it moves thereunder. After the container passes under the acid bowl 30, it proceeds along the bench 4 in front of an operator who applies solder to the seam.

Intermediate the benches 4 and 5 is the turning mechanism comprising four upright supporting members 44, which may be channelled for convenience, attached by means of the bolts 45 to the sides of the channel member 15 and spaced therefrom by the bushings 46. On one side of the channel member 15 is a rod 47 attached at its ends to the upright supports 44 by means of bolts 45'; on the other side of the member is a table 48 supported by the brackets 49 adjustably attached to the sides of the channel member by the bolts 50 extending through the slots 51 in the brackets. As a container is moved by the conveyer onto this intermediate part it turns slightly so that one of the lower sides thereof rests on the table 48, the corner of the can moving under the influence of gravity along the canted table to the opposite side of the channel member 15.

A stay 55 has one end attached to the channel member 15 and its other end 57 extending downwardly and inwardly to the bottom of the channel member adjacent one side thereof. As the container approaches the stay 55, the free end of the stay engages the container adjacent the corner thereof as it rests upon the table 48. Upon further movement, the container rides upon the forward curved portion of the stay. The abutment 58 adjustably mounted at an angle to the container by means of the bolts 59 in slots 60 may be adjusted to retain the container in its proper position on the conveyer. As the container continues to move, the side adjacent the stay is raised and the container is turned about the corner resting on the table until it approaches a point where it tends to fall away from the stay on to the table. It is prevented from doing so by the abutment 58 until the container has been moved sufficiently far for the rear end thereof to slide down the cam-like surface 62 on the abutment, thus gradually lowering the side of the container to the table. The abutment 64 adjustably mounted by means of the bolts 65 in slots 66 is adapted to engage and retain the front end of the container during its rotative movement. Since the container in this manner has been turned about one corner thereof, it has been rotated through an angle of substantially ninety degrees with reference to its longitudinal axis.

However, since the cans are made from angular pieces of tin, the free edges thereof form diagonal corners. It is necessary that the can be completely inverted or turned through an angle of one hundred and eighty degrees before the lower seam is uppermost. To turn the container, an additional ninety degree, the cycle just described is repeated by the container passing the second stay 55 positioned similarly to the one previously described with cooperative abutments 58 and 64 performing similar functions to those previously described. After passing the two stays, the container is in inverted position and the other seam is uppermost ready for the application of acid and solder.

The container continues along the conveyer and is engaged by the guides 70 and 71 which raise it to its proper position with the unsoldered seam uppermost and guide it onto the horizontal supports 12 on the bench 5. Since the benches 5 are similar to the benches 4 previously described, a description of these is unnecessary. It is to be noted, however, that the shaft 16 at this end of the machine is mounted in bearings which are adjustable longitudinally of the conveyer by means of the members 74 to afford proper tension in the chains and to correct for temperature changes therein.

In the operation of the machine containers are placed on each of the benches 4 with one of the seams on top and with the diagonal through the seam corners substantially vertical. In this manner, two lines of containers are moved by the conveyer chains 8 and lugs 7 along the horizontal supporting members 12 of the conveyers 1 and 2. The containers pass under the acid bowl 30 and the brush 41 moves along the seams as the containers progress and automatically applies acid thereto. An operator immediately applies solder to the seams presented, as the can moves past him. When the soldering of the first seam has been completed, the can moves on to the table 48 intermediate the benches 4 and 5 where one corner of the can is engaged by the first stay 55 which causes the can to ride along the stay and rotate about the corner resting on the table 48 until it turns about said corner and rests against the abutment 58. As it continues to move, the rear end of the can slides down the incline 62 and gradually lowers itself to the table. The abutment 64 engages the forward end of the can and retains it in proper position. In this manner the can is rotated through an angle of ninety degrees. This cycle is repeated when the container engages the second stay 55 and abutments 58 and 64 which turn it an additional ninety degrees. Thereafter it passes in inverted position onto the bench 5 through the guides 70 and 71, and the second seam is acidified and soldered by a second operator in the same manner as the first seam on the bench 4. The can is then delivered from the bench 5 ready for distribution.

For convenience, the machine is constructed so that two lines of cans may be passed through at the same time, one along conveyer 1 and the other along conveyer 2. A suitable oven 76 is provided between the conveyer for heating the soldering irons and is preferably centrally positioned so that the four operators may use a single oven. Both conveyors may be run from the same pulley and the conveyer sprockets may be mounted on opposite ends of suitable shafts positioned at the respective ends of the machine. In this manner, a very compact arrangement is provided, which facilitates maximum production with a minimum of labor and materials.

It will be seen that a machine has been provided for automatically applying acid to the seams of two lines of containers without stopping their movement on a conveyer and that the seams of the containers are automatically presented to four operators for the manual application of solder thereto, thereby minimizing the labor required. Further, the device is simple in operation, inexpensive and rugged in construction, and fully capable of withstanding the rough usage to which it is likely to be subjected.

Since various changes may be made in the above embodiment without departing from the spirit of the invention, it is to be understood that all matter herein set forth is to be taken as illustrative and not in a limiting sense.

Having thus described my invention, I claim:

1. In a machine of the class described, the combination of a conveyer for containers, and a horn member adapted to engage the forward end of a container and a stationary guide plate positioned at angle to said horn member and operative to force the container to ride upwardly along the cam-like surface of the horn member until said container is turned through an angle of substantially ninety degrees.

2. In a machine of the class described, the combination of a conveyer for containers and the like, a stationary table on one side of said conveyer for partially supporting containers during their movement, means on the opposite side of said conveyer for engaging the side of the container and raising it about a corner resting on said table until it tips about said corner.

3. In a machine of the class described, the combination of a conveyer for containers and the like, a stationary table on one side of said conveyer for partially supporting containers during their movement, stationary means on the opposite side of said conveyer for engaging the side of the container and raising it about a corner resting on said table until it tips about said corner, and means for lowering gradually the side of the container on to said table after it is tipped about said corner.

4. In a machine of the class described, the combination of a conveyer for containers and the like, a curved stay in stationary position on one side of said conveyer, said stay being adapted to engage the forward end of a container and raise it about one corner thereof, and means on the opposite side of said conveyer for engaging said container when it turns about said corner to it through the remaining turning movement.

5. In a machine of the class described, the combination of a conveyer for moving containers and the like, stationary means for engaging and raising the forward end of a container as it moves along said conveyer to turn it about one corner thereof, and means on the opposite side of said conveyer for engaging said container when it has been turned about said corner a predetermined amount to ease it down on the conveyer.

6. In a machine of the class described, the combination of a conveyer, a stationary table extending along one side of the conveyer canted slightly to the horizontal to engage and support one side of a container, means for engaging said container and turning it about the corner resting on the table, and abutments for engaging said container when it tips about said corner to prevent its falling on to said table, one of said abutments having an angular surface to lower the container about said corner gradually to an angular position substantially ninety degrees different from its original position.

7. In a machine of the class described, the combination of a conveyer comprising a chain with lugs thereon, a horizontal channel member extending beneath said chain to support same, a stationary table mounted at one side of said channel member adapted to support one side of a container on said conveyer, and means on the other side of said channel member for engaging the forward end of a container to turn same on said table.

8. A can soldering machine, including in combination, a plurality of cam supporting racks, a reversing table having a laterally inclined surface positioned between said racks, a conveyer adapted to move successive containers along said racks and across said reversing table, and means for engaging a side of each successive container as it moves across said table, and operative to raise the same about one corner resting on said laterally inclined surface until it tips about said corner.

9. A can soldering machine, including in combination, a pair of cam supporting racks, a reversing table having a laterally inclined surface positioned between said racks, a conveyer adapted to move containers successively along said racks and across said reversing table, soldering apparatus positioned above each of said racks and adapted to operatively engage the containers as they move therealong, and means operative to tilt each successive container about one corner resting on said inclined surface as they move across the same.

10. In a machine of the class described, the combination with a conveyer for containers and the like, of a table support, inclined means at one side of said table adapted to engage the side of the container to raise the same about a corner resting on said table, and a guide plate conducting the container up said inclined means as it moves along said conveyer until it tips about said corner.

11. In a machine of the class described, the combination with a conveyer for containers and the like, of a stationary horn having an inclined portion adapted to engage the side of the container to raise the same about a corner resting on said table, and a guide plate guiding said container up said inclined portion until it tips about said corner.

This specification signed this 20th day of October, 1926.

NAPOLEON FRANK PARADISE.